Patented Dec. 15, 1931

1,837,072

UNITED STATES PATENT OFFICE

ADAM SASSUR, OF CHICAGO, ILLINOIS

PROCESS FOR MAKING BRICKS

No Drawing.    Application filed March 21, 1930.   Serial No. 437,944.

This invention relates to certain novel improvements in a process for making bricks and has for its principal object the provision of a new process of this character which will be simple in use and economical in manufacture.

It is among the objects of my invention to provide a process for hardening brick which may be expeditiously used in the manufacture of bricks from iron and steel slag.

Another object of my invention is to provide a process of the above described character which will produce bricks of greater resistance to corrosion and of greater strength than bricks now commonly made from iron and steel slag.

Other objects will appear hereinafter.

The invention consists in the novel combination of substances used in my improved process and in the manner of treating these substances.

The invention will be best understood by reference to the following specification and the example included therein.

The present invention relates to a process for making bricks of superior quality from iron slag. In the manufacture of bricks of this type the manufacturers use air-cooled and granulated iron slag or slag that is granulated by water cooling. It has been customary in the past to use from five percent to seven percent lime or lime slag bricks or cement instead of lime in making cement slag bricks.

The invention will be best understood by reference to the following examples wherein the preferred embodiments of my invention are described although it is understood that I do not limit myself to the details set forth therein:

Example 1.—About 15,000 pounds of iron slag are put into a drum mixer. To this is added from 2 to 3 percent of lime and from 2 to 2½ percent hydrated calcium sulphate, $Ca(SO_4) \cdot 2H_2O$ (gypsum) and three to five percent limestone which contains about fifty percent calcium carbonate and fifty percent magnesium carbonate. For this purpose I may use dolomite limestone. The drum mixer should be tightly closed. A steam pipe leads into the drum mixer and steam is lead into the drum mixer to heat the material during the mixing operation so that the mixture may be warm when ready to be pressed into bricks. The material in the drum mixer is mixed for about fifteen or twenty minutes and is then ready to be pressed into bricks.

Example 2.—Fifteen thousand pounds of iron slag are put into a mixer and to this is added from 2 to 3 per cent of lime and 2 to 2½ per cent of calcium sulphate (gypsum). Steam is led into the mixture, and the same is agitated for about 15 to 20 minutes, after which the mixture is ready to be pressed into bricks, and the bricks thus formed are then allowed to cool.

If raw or hydrated calcium sulphate is used as in the above examples, the material in the drum mixer should be heated to about 375° F. In this manner about three-fourths of the water of crystallization in the calcium sulphate will be split off forming $2 Ca(SO_4) H_2O$. In the event that dehydrated calcium sulphate is used and the other materials are dry water must be added as the moisture required for subsequent hydration of the calcium sulphate in the mixture is from ten to twelve percent and limestone provides a filler and an absorbent for this moisture though other water absorbent bodies and fillers may be used. During cold weather quicklime should be used as it absorbs about fifty percent of its weight in water and also because it helps to heat the mixture in the process of hydration. Hydrated lime can be used during the summer months if desired.

The bricks are then pressed into the desired size and shape in a suitable machine adapted to this purpose and they are then put into a dry boiler and allowed to remain therein for from about eight to ten hours under from approximately 120 to 300 pounds of steam pressure for the purpose of drying and hardening the bricks. During this curing process the calcium sulphate $2Ca(SO_4) \cdot H_2O$ becomes $Ca(SO_4) \cdot 2H_2O$ crystallizes simultaneuosly with the other compounds, and forms an integral part of the solidified product.

The bricks are then taken out of the dry boiler and are ready for shipment.

Bricks made by this new and improved process will stand a pressure of from about 4,400 pounds per square inch to about 5,000 pounds per square inch, while bricks made of the same materials but made as has been customary in the art heretofore will withstand pressures of only from about 2,000 to 3,000 pounds per square inch. Moreover, bricks made by my process are not only not readily attacked by water but absorb water at a rate of fifty percent slower than bricks manufactured by other processes. Likewise, bricks made by my process are highly resistant to heat, fire, and acids.

The natural color of bricks made by my process is a light Bedford but I am not limited to this color and bricks of a greater variety of colors can be manufactured by my process.

It is understood that various changes may be made in the process described herein without departing from the spirit of the invention or sacrificing any of its advantages. Thus, wherever in the example and in the claims I refer to a limestone containing approximately fifty percent calcium carbonate and fifty percent magnesium carbonate I may use therefor dolomite limestone. Likewise wherever I refer to gypsum I mean to include calcium sulphate in any stage of hydration and where I use the term "lime" it is understood I may include therein either calcium oxide or calcium hydroxide or the equivalents of these.

Having thus described my invention what I claim as new and desire to protect by Letters Patent is:

1. The process of manufacturing bricks which comprises mixing in a closed drum mixer and in an atmosphere of steam, for a period of approximately fifteen or twenty minutes, iron slag with from two percent to three percent of lime, two percent to two and one-half percent of gypsum, from three to five percent of limestone containing substantially fifty per cent of calcium carbonate and fifty percent of magnesium carbonate, pressing the mixture thus obtained into bricks of suitable size and shape, and then exposing the bricks thus obtained to an atmosphere of steam under a pressure of from approximately one hundred twenty pounds to three hundred pounds per square inch for a period of approximately eight to ten hours.

2. The process of manufacturing brick which comprises mixing in a closed drum mixer and in an atmosphere of steam at approximately three hundred seventy-five F. for a period of approximately fifteen or twenty minutes iron slag, from two percent to three percent lime, from two percent to two and one-half percent of hydrated calcium sulphate, and from three percent to five percent of limestone containing substantially fifty percent calcium carbonate and fifty percent magnesium carbonate, pressing the mixture thus obtained into bricks of suitable size and shape, and then exposing the bricks thus obtained to an atmosphere of steam under a pressure of from approximately one hundred twenty pounds to three hundred pounds per square inch for a period of approximately eight to ten hours.

3. The process of manufacturing bricks which comprises subjecting a mixture of calcium sulphate, lime, and furnace slag to the action of steam under pressure, pressing the mixture thus formed into bricks, and exposing the bricks to the action of steam under pressure.

4. The process of manufacturing bricks which comprises subjecting a mixture of hydrated calcium sulphate, lime, and furnace slag to the action of steam under pressure, pressing the mixture thus formed into bricks, and exposing the bricks to the action of steam under pressure.

5. The process of manufacturing bricks which comprises subjecting a mixture of dehydrated calcium sulphate, lime, and furnace slag to the action of steam under pressure, in the presence of water, heating the mixture to dehydrate the calcium sulphate, pressing the mixture thus formed into bricks, and exposing the bricks to the action of steam under pressure.

6. The process of manufacturing bricks which comprises subjecting a mixture of dehydrated calcium sulphate, lime, and furnace slag to the action of steam under pressure, in the presence of water, heating the mixture to partially dehydrate the calcium sulphate, pressing the mixture thus formed into bricks, and exposing the bricks to the action of steam under pressure.

7. The process of manufacturing bricks which comprises subjecting a mixture of hydrated calcium sulphate, lime, and furnace slag to the action of steam under pressure, heating the mixture to a temperature where the calcium sulphate splits off part or all of its water of crystallization, pressing the mixture thus formed into bricks, subjecting the bricks to the action of steam under pressure.

8. The process of manufacturing bricks which comprises subjecting a wet mixture of dehydrated calcium sulphate, lime, and furnace slag to the action of steam under pressure, heating the mixture to a temperature where the calcium sulphate splits off part or all of its water of crystallization, pressing the mixture thus formed into bricks, subject the bricks to the action of steam under pressure.

9. The process of manufacturing bricks which comprises subjecting a mixture of hydrated calcium sulphate, lime, and furnace slag to the action of steam under pressure, heating the mixture to a temperature where the calcium sulphate splits off part or all of its water of crystallization, pressing the mixture thus formed into bricks, subjecting the bricks to the action of steam under pressure for about eight to ten hours.

10. The process of manufacturing bricks which comprises subjecting a mixture of calcium sulphate, lime, and furnace slag to the action of steam under pressure for about 15 to 20 minutes, pressing the mixture thus formed into bricks, and exposing the bricks to the action of steam under pressure.

11. The process of manufacturing bricks which comprises subjecting a mixture of calcium sulphate, alkaline earth metal carbonate, lime, and furnace slag to the action of steam under pressure, pressing the mixture thus formed into bricks, and exposing the bricks to the action of steam under pressure.

12. The process of manufacturing bricks which comprises subjecting a mixture of hydrated calcium sulphate, lime, alkaline earth metal carbonate, and furnace slag to the action of steam under pressure, pressing the mixture thus formed into bricks, and exposing the bricks to the action of steam under pressure.

13. The process of manufacturing bricks which comprises subjecting a mixture of dehydrated calcium sulphate, lime, alkaline earth metal carbonate, and furnace slag to the action of steam under pressure, in the presence of water, heating the mixture to dehydrate the calcium sulphate, pressing the mixture thus formed into bricks, and exposing the bricks to the action of steam under pressure.

14. The process of manufacturing bricks which comprises subjecting a mixture of dehydrated calcium sulphate, lime, alkaline earth metal carbonate, and furnace slag to the action of steam under pressure, in the presence of water, heating the mixture to partially dehydrate the calcium sulphate, pressing the mixture thus formed into bricks, and exposing the bricks to the action of steam under pressure.

15. The process of manufacturing bricks which comprises subjecting a mixture of hydrated calcium sulphate, lime, alkaline earth metal carbonate, and furnace slag to the action of steam under pressure, heating the mixture to a temperature where the calcium sulphate splits off part or all of its water of crystallization, pressing the mixture thus formed into bricks, subjecting the bricks to the action of steam under pressure.

16. The process of manufacturing bricks which comprises subjecting a mixture of calcium sulphate, dolomite limestone, lime, and furnace slag to the action of steam under pressure, pressing the mixture thus formed into bricks, and exposing the bricks to the action of steam under pressure.

17. The process of manufacturing bricks which comprises subjecting a mixture of calcium sulphate, a water absorbent body, lime, and furnace slag to the action of steam under pressure, pressing the mixture thus formed into bricks, and exposing the bricks to the action of steam under pressure.

In testimony whereof I affix my signature.
ADAM SASSUR.